UNITED STATES PATENT OFFICE.

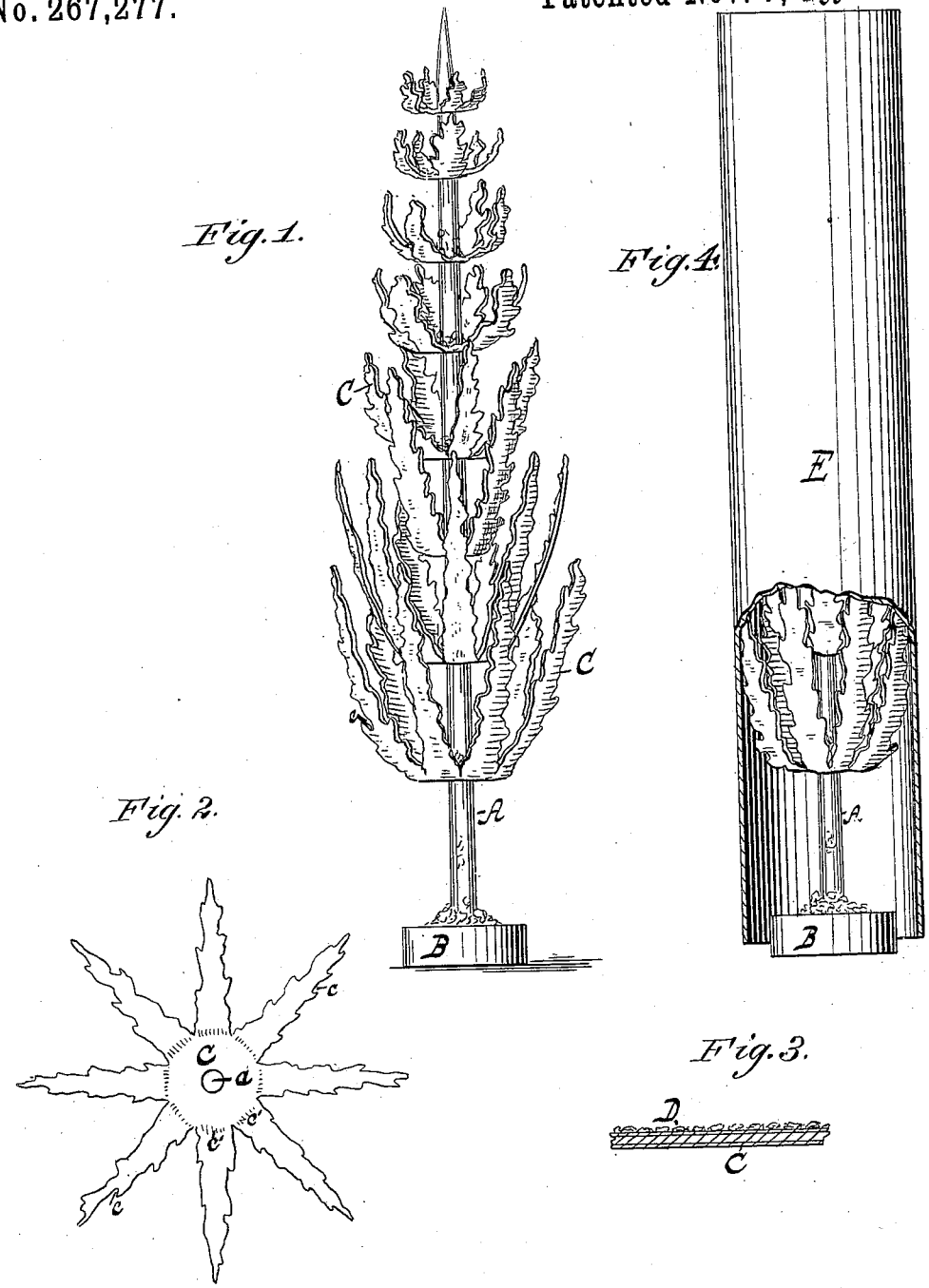

WILLIAM T. STRASSER, OF NEW YORK, N. Y.

TOY TREE.

SPECIFICATION forming part of Letters Patent No. 267,277, dated November 7, 1882.

Application filed April 3, 1882. (No model.)

*To all whom it may concern:*

Be it known that I, WILLIAM T. STRASSER, a citizen of the United States, residing at New York, in the county of New York and State of New York, have invented certain new and useful Improvements in Toy Trees, of which the following is a specification, reference being had therein to the accompanying drawings.

This invention consists in a new manufacture—namely, a toy tree composed of a stem having a suitable base, and of a series of star-shaped pieces representing leaves or branches fastened to said stem one above the other and gradually decreasing in diameter in an upward direction. With this is combined a tubular case open at both ends, as hereinafter more fully set forth.

This invention is illustrated in the accompanying drawings, in which Figure 1 represents a side elevation. Fig. 2 is a plan view of one of the star-shaped pieces composing the branches. Fig. 3 is a sectional view of a portion of one of the star-shaped pieces. Fig. 4 shows a tubular or cylindrical case, partly in section, having the tree inclosed therein.

Similar letters of reference indicate corresponding parts.

The letter A designates a stem inserted into a base, B, which may be of circular, oval, angular, polygonal, or other shape and general outline, and made of any suitable material.

The letter C designates the star-like pieces, having irregular edges $c$ to make them the more nearly represent the leaves or branches of a tree or trees, and composed of muslin, paper, or other similar flexible material. The central portion of each piece C is provided with an opening, $a$, for the insertion of the stem, which is done by simply running the said stem A through the opening $a$ until it is in a proper position. The star-shaped pieces are of different sizes, and so arranged on the stem that they decrease in diameter or size in an upward direction. When a sufficient number have been placed in position on the stem I secure them in place by dipping in mucilage or other adhesive substance, and before the adhesive substance has dried I sprinkle upon the star-like pieces $c$ a mass of scales, D, obtained by disintegrating mica or other mineral, common salt, or any other material which adheres to the mucilage or the like, forming an incrustation or surface-glazing representing snow or ice. It will be perceived that a very beautiful effect is thereby produced.

The invention may be used for representing any shape or kind of tree as may be desired, and colored as fancy or taste may dictate.

In order to prevent injury to the article in its transportation, I pack it in a tubular or cylindrical case, E, as shown in Fig. 4. This case is open at both ends for the facile insertion of the tree therein, and by reason of its tubular or cylindrical shape it is not liable to disarrange or injure the branches.

In the manufacture of the star-pieces C, I dent them, as at $c'$, so that they will bend uniformly when inserted in the case D. However, the dents may be omitted altogether or so arranged that they will bend downward, if necessary.

What I claim as new, and desire to secure by Letters Patent, is—

A toy tree composed of an upright stem having a suitable base, and of a series of star-shaped pieces secured to said stem one above the other and gradually decreasing in size in an upward direction, as and for the purpose set forth.

In testimony whereof I affix my signature in presence of two witnesses.

WILLIAM T. STRASSER.

Witnesses:
 FRANCIS C. BOWEN,
 A. JAMES LASK.